(12) United States Patent
Bucklew et al.

(10) Patent No.: US 11,050,559 B2
(45) Date of Patent: Jun. 29, 2021

(54) QUANTUM COMMUNICATIONS SYSTEM USING TALBOT EFFECT IMAGE POSITION AND ASSOCIATED METHODS

(71) Applicant: EAGLE TECHNOLOGY, LLC, Melbourne, FL (US)

(72) Inventors: Victor G. Bucklew, Colorado Springs, CO (US); James A. Nagel, Fort Wayne, IN (US); Brent W. Plansinis, Saint Cloud, FL (US); Timothy C. Burt, Webster, NY (US); Catheryn D. Logan, Melbourne, FL (US); Michael R. Lange, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 36 days.

(21) Appl. No.: 16/687,767

(22) Filed: Nov. 19, 2019

(65) Prior Publication Data
US 2021/0152346 A1    May 20, 2021

(51) Int. Cl.
| H04L 9/08 | (2006.01) |
|---|---|
| H04B 10/70 | (2013.01) |
| H04B 10/25 | (2013.01) |
| H04B 10/66 | (2013.01) |
| H04B 10/50 | (2013.01) |

(52) U.S. Cl.
CPC ........... *H04L 9/0858* (2013.01); *H04B 10/25* (2013.01); *H04B 10/50* (2013.01); *H04B 10/66* (2013.01); *H04B 10/70* (2013.01)

(58) Field of Classification Search
None
See application file for complete search history.

(56) References Cited

U.S. PATENT DOCUMENTS

| 7,831,049 B1 | 11/2010 | Kanter |
|---|---|---|
| 9,306,739 B1 | 4/2016 | Troupe |
| (Continued) | | |

FOREIGN PATENT DOCUMENTS

| CN | 101040483 | 9/2007 |
|---|---|---|
| CN | 107733640 | 2/2018 |
| (Continued) | | |

OTHER PUBLICATIONS

Skoric, B., "Quantum Readout of Physical Unclonable Functions: Remote Authentication without Trusted Readers and Authenticated Quantum Key Exchange without Initial Shared Secrets," (Cryptology ePrint Archive; vol. $^{2009}/_{369}$), IACR, 2009, pp. 1-16.
(Continued)

*Primary Examiner* — David W Lambert
(74) *Attorney, Agent, or Firm* — Allen, Dyer, Doppelt + Gilchrist, P.A.

(57) ABSTRACT

A quantum communications system may include a transmitter node, a receiver node, and a quantum communications channel coupling the transmitter node and receiver node. The transmitter node may cooperate with the quantum communications channel defining at least one Talbot effect image position along the quantum communications channel. The receiver node may use located along the quantum communications channel at the at least one Talbot effect image position.

21 Claims, 10 Drawing Sheets

(56) References Cited

U.S. PATENT DOCUMENTS

| | | | |
|---|---|---|---|
| 2003/0002674 A1* | 1/2003 | Nambu | H04L 9/0852 |
| | | | 380/256 |
| 2007/0064945 A1 | 3/2007 | Yuan et al. | |
| 2016/0233964 A1 | 8/2016 | Frohlich et al. | |
| 2016/0234017 A1* | 8/2016 | Englund | H04B 10/0795 |
| 2016/0234018 A1 | 8/2016 | Frohlich et al. | |
| 2018/0191496 A1 | 7/2018 | Duplinskiy et al. | |
| 2018/0198608 A1* | 7/2018 | Nordholt | H04B 10/70 |
| 2018/0343116 A1* | 11/2018 | Nordholt | H04L 9/32 |
| 2019/0323892 A1 | 10/2019 | Ye et al. | |
| 2020/0153619 A1 | 5/2020 | Ribordy | |
| 2020/0274701 A1 | 8/2020 | Yuan et al. | |
| 2021/0099236 A1 | 4/2021 | Bucklew et al. | |

FOREIGN PATENT DOCUMENTS

| | | |
|---|---|---|
| CN | 108599870 | 9/2018 |
| CN | 108809638 | 11/2018 |
| EP | 3185463 | 6/2017 |
| GB | 2559801 | 8/2018 |
| WO | 2012044149 | 4/2012 |
| WO | 2012074369 | 6/2012 |

OTHER PUBLICATIONS

Kent et al. "Secure and Robust Transmission and Verification of Unknown Quantum States in Minkowski Space," Scientific Reports, vol. 4, Article No. 3901, 2014, pp. 1-21.

Goorden et al., "Quantum-Secure Authentication of a Physical Unclonable Key," Optica vol. 1, Issue 6, pp. 421-424.

Deachapunya et al., "Realization of the Single Photon Talbot Effect with a Spatial Light Modulator," Optical Express 20029, vol. 24, No. 18, Sep. 2016, pp. 1-7.

Song et al., "Experimental Observation of Quantum Talbot Effects," Phys. Rev. Lett. 107, Issue 3, Jul. 2011, pp. 033902-1-033902-4.

Brent W. Plansinis, "Applicaitons of Space-Time Duality," Thesis Paper, The Institute of Optics Arts, Sciences and Engineering Edmund A. Hajim School of Engineering and Applied Sciences, University of Rochester, Rochester, New York, 2017 pp. 1-144.

Plansinis et al., "Single-Pulse Interference Caused by Temporal Reflection at Moving Refractive-Index Boundaries," J. Opt. Soc. Am. B, JOSAB vol. 34 No. 10, Sep. 2017, pp. 2274-2280.

Azaña et al., "Temporal Talbot Effect in Fiber Gratings and its Applications," Appl. Opt., vol. 38 No. 32, (Nov. 1999), pp. 6700-6704.

Trushechkin et al., "Quantum-Key-Distribution Protocol with Pseudorandom Bases," Phys. Rev. A 97, 012311 (2018), arXiv:1706.00611v1, Jun. 2, 2017, pp. 1-16.

Korzh et al., "Provably Secure and Practical Quantum Key Distribution over 307 km of Optical Fibre," Nature Photonics vol. 9, Jul. 2014, pp. 1-13.

Diamanti et al., "Practical Challenges in Quantum Key Distribution," npj Quantum Information, vol. 2, Article No. 16025, Nov. 2016, pp. 1-12.

Bucklew et al., U.S. Appl. No. 16/583,346, filed Sep. 26, 2019, (cited application is stored in the USPTO's IFW system).

Bucklew et al., U.S. Appl. No. 16/668,002, filed Oct. 30, 2019, (cited application is stored in the USPTO's IFW system).

Bucklew et al., U.S. Appl. No. 16/668,025, filed Oct. 30, 2019, (cited application is stored in the USPTO's IFW system).

Bucklew et al., U.S. Appl. No. 16/658,398, filed Oct. 21, 2019, (cited application is stored in the the USPTO's IFW system).

Bucklew et al., U.S. Appl. No. 17/179,490, filed Feb. 2, 2021, (cited application is stored in the the USPTO's IFW system).

Barros et al.: "Free-Space Entangled Quantum Carpets," Arxiv.Org. Cornell University Library, 201 Olin Library Cornell University, Ithaca, NY, 14853, DOI: 10.1103/Physreva.95.042311, Feb. 23, 2017, pp. 1-10.

"Quantum Key Distribution; Components and Internal Interfaces," ETSI Draft, QKD05_11_Components_Interfaces, European Telecommunications Standards Institute (ETSI), 650, Route Des Lucioles, F-06921 Sophia-Antipolis, France, Oct. 14, 2009, pp. 1-24.

Farias et al.: "Quantum Information Processing by Weaving Quantum Talbot Carpets," Arxiv.Org. Cornell University Library, 201 Olin Library Cornell University, Ithaca, NY, 14853, DOI: 10.1103/Physreva.91.062328, Dec. 8, 2014 , pp. 1-11.

* cited by examiner

QUANTUM COMMUNICATIONS SYSTEM USING TALBOT EFFECT IMAGE POSITION AND ASSOCIATED METHODS

FIELD OF THE INVENTION

The present invention relates to communications systems, and, more particularly, to quantum communications systems and related methods.

BACKGROUND OF THE INVENTION

In a quantum communications system, sometimes referred to as a quantum information system, information is exchanged between a transmitter node and a receiver node using encoded single photons. Each photon carries information that is encoded on a property of the photons, such as its polarization, phase, or energy in time. These quantum communications systems generally require sending information from one node to another node, such as a transmitter node, usually referred to as "Alice," and a receiver node, usually referred to as "Bob." The term quantum communications system encompasses multiple applications. For example a quantum key distribution (QKD) system allows the sharing of cryptographic keys between the transmitter node and receiver node, thus allowing a more secure communication between the two parties. A QKD system provides a test whether any part of the key would be known to an unauthorized third party eavesdropper, usually referred to as "Eve." Other applications of a quantum communications system include quantum random number generator (QRNG) systems that use the inherent indeterminacy of quantum entangled photons to produce random binary digits, and quantum secure direct communication (QSDC) systems that transfer direct information between Alice and Bob without a distribution key. In QSDC systems, the transmitter node as Alice generates quantum photons that carry secure quantum information representative of the data to be communicated. The quantum photons carrying the data are decoded upon receipt at the receiver node as Bob.

QSDC systems are based on quantum mechanics for direct transmission of information without employing a distributed cryptographic key to encrypt the data. QSDC systems may be more efficient than some keyed communication systems because the cryptographic key development and key storage requirements are eliminated. Transmitted photons carrying data within the QSDC system may be more readily maintained in confidence without being erased, manipulated or monitored by unintended third parties, such as Eve. These QSDC systems may provide tamper evident communication links that are compatible with the direct transmission of data at the single photon level. As a result, QSDC systems may become more important as quantum computers increase in sophistication and allow conventional cryptographic keys to be more easily broken, while quantum interconnects are developed that network computers together. Improvements in QSDC systems may also provide quantum signatures and improve the efficiency and impart greater security in a quantum communications channel.

SUMMARY OF THE INVENTION

In general, a quantum communications system may include a transmitter node, a receiver node, and a quantum communications channel coupling the transmitter node and receiver node. The transmitter node cooperates with the quantum communications channel defining at least one Talbot effect image position along the quantum communications channel. The receiver node may be located along the quantum communications channel at the at least one Talbot effect image position.

The transmitter node may be configured to generate temporally or phase modulated photons and the receiver node may comprise a system for detecting time binned or phase binned quantum states, respectively. The receiver node may comprise at least one single photon detector. The quantum communications channel may comprise a single mode optical fiber.

The transmitter node may be configured to generate spatially modulated photons and the quantum communications channel may comprise a multi-mode optical fiber. The transmitter node may be configured to perform optical polarization encoding.

Another aspect is directed to a method of operating a quantum communications system that may comprise a transmitter node, a receiver node, and a quantum communications channel coupling the transmitter node and receiver node. The method may comprise operating the transmitter node to cooperate with the quantum communications channel to define at least one Talbot effect image position along the quantum communications channel, and operating the receiver node located along the quantum communications channel at the at least one Talbot effect image position.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete.

Figure 1:
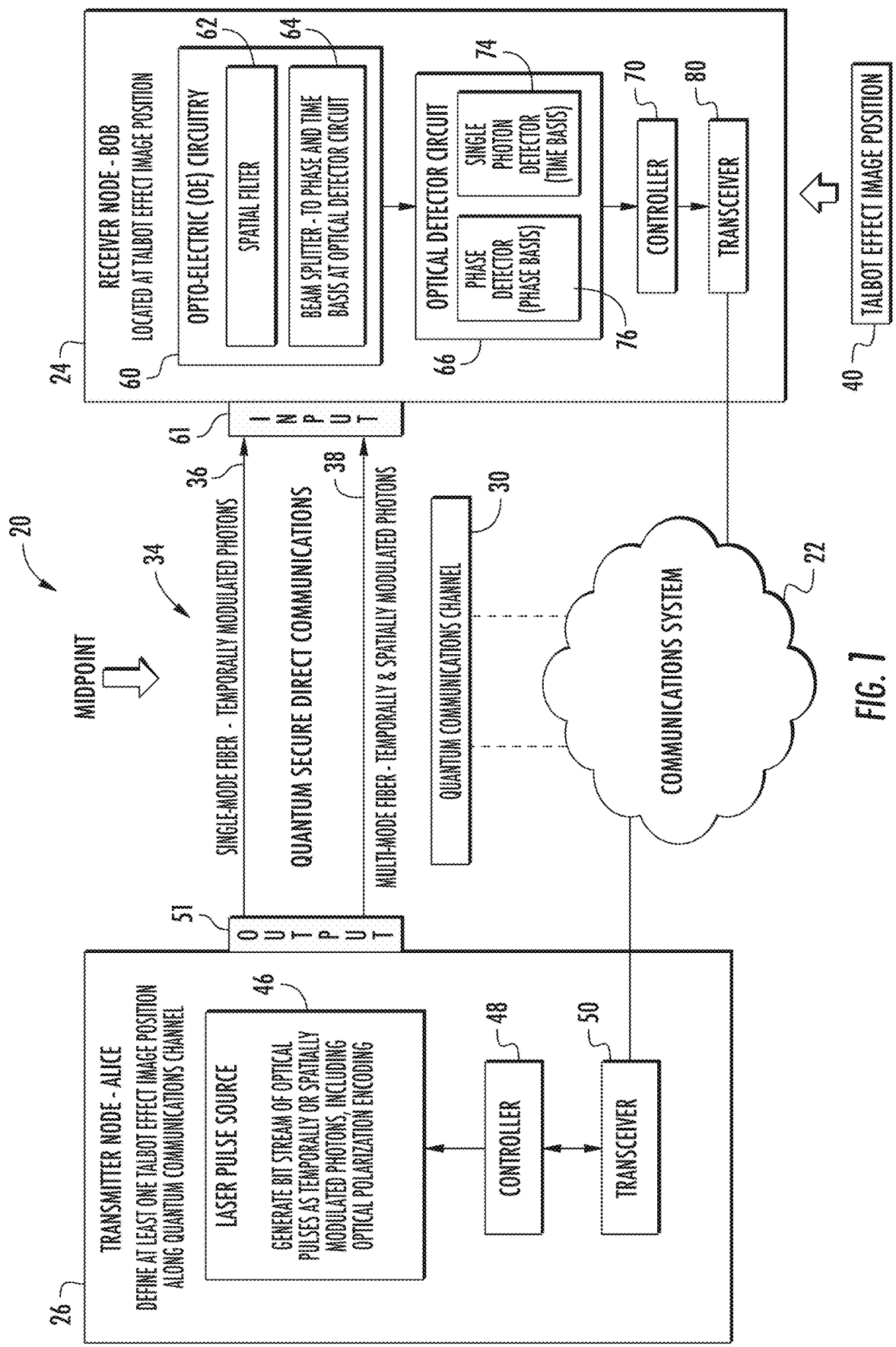
FIG. 1 is a block diagram of the quantum communications system operating as a tamper evident system according to the invention.

Referring initially to FIG. 1, a quantum communications system is illustrated generally at 20 that may be operative as a quantum secure direct communications (QSDC) system, which permits direct communication, such as without use of a cryptographic key. The quantum communications system 20 includes a transmitter node 26 referred to as Alice, a receiver node 28 referred to as Bob, and a quantum communications channel 30 coupling the transmitter node and receiver node. The quantum communications system 20 as a QSDC system may use single photon self-interference, Talbot re-imaging at the single photon level, and the no-cloning theorem of quantum mechanics as a physical layer of security that can be used to more securely transmit quantum data streams within the quantum communications channel 30 without the additional use of a cryptographic key in some embodiments.

The single photon self-interference and public sections of the quantum communications channel 30 scramble the original data stream, while self-interference in the private sections of the quantum communications channel reconstruct the original data stream at the receiver node 28 where Bob is located. The input state at the transmitter node 26 undergoes self-interference that broadly redistributes its probability distribution function and spoofs attempts to gain information about it within the public sections of the quantum communications channel 30 where an eavesdropper, referred to as Eve, would be located.

The receiver node 28 is positioned at the Talbot re-imaging point as explained in greater detail below, which may include a midpoint or full length, and may include multiples of those distances. The midpoint is shown by the arrow in FIG. 1 where due to single photon self-interference, the probability distribution function of the initial state is reconstructed. Data may be encoded into optical pulse time bins. Photon self-interference in the spatial domain and use of a spatial filter in the spatial domain may reveal data tampering. Because the spatial probability distribution function cannot be perfectly categorized, cloned and reintroduced to the public section of the quantum communications channel 30, any attempt to monitor, misrepresent or omit temporal data may introduce spatial probability distribution changes that will not cleanly exit a spatial filter at the receiver node 28, thus revealing tampering by Eve.

In an example, the quantum communications channel 30 may include a fiber optic communications channel 34, which may be a single mode optical fiber 36 or a multi-mode fiber 38. The single mode optical fiber 36 may be used for transmitting temporally modulated photons, and the multi-mode optical fiber 38 may be used for transmitting both temporally and spatially modulated photons. The quantum communications channel 30 may include a free-space optical (FSO) communications channel such as by satellite or line-of-sight. The transmitter node 26 may cooperate with the quantum communications channel 30 and define at least one Talbot effect image position 40 along the quantum communications channel 30. The receiver node 28 in an example is located along the quantum communications channel 30 at the at least one Talbot effect image position 40, which includes the midpoint, since it is possible to locate the receiver node 28 along the midpoint of the Talbot effect image position 40 as illustrated where the arrow depicts the midpoint or half image in FIG. 1.

As known to those skilled in the art, the Talbot effect is a near-field diffraction effect. An image results from the optical pulses passing through optical transmitter components, such as an optical grating and spatial light modulator. An image is formed that is repeated at regular distances, called the Talbot length or Talbot effect image position 40, while repeated images are called self-images or Talbot images. At the half distance of that Talbot length, or the midpoint of the Talbot length, a self-image occurs, but it is phase shifted by half a period.

In an example, the transmitter node 26 may be configured to generate temporally modulated photons that are communicated over the single mode optical fiber 36. The transmitter node 26 may also be configured to generate spatially modulated photons that are transmitted over the multi-mode optical fiber 38. In both cases, the temporally or spatially modulated photons may use optical polarization encoding, and each photon may have a transmitted quantum basis.

The transmitter node 26 communicates with the receiver node 28 over the quantum communications channel 30. Both nodes 26,28 may communicate via a communications system 22, which may include a classical communications channel and may be fiber optic, free-space, wired, or another communications channel. This communications system 22 may be used if additional functions are desired, such as cryptographic key generation and quantum key distribution (QKD), or communication with networked devices using conventional transceivers. However, the quantum communications system 20 in the illustrated embodiment is described relative to a QSDC system and no cryptographic key sifting occurs in this example. The quantum communications channel 30 may be part of the communication system 22 as indicated by the dashed lines connecting the two, indicating that both the quantum communications and non-quantum communications may be transmitted over the fiber optic communications channel 34 as part of the communications system 22.

When describing a quantum communications systems 20 relative to a QSDC system in the current example, the transmitter node 26 is usually referred to as "Alice" and the receiver node 28 is usually referred to as "Bob." In this description, the terms "transmitter node 26" and "Alice" are interchangeable and both may be used in this description and are given the reference numeral 26. The terms "receiver node 28" and "Bob" are interchangeable in this description and both are given the reference numeral 28. Any eavesdropper on the quantum communications system 20 is usually referred to as "Eve" and may be located anywhere on the public section forming the communications link in the quantum communications channel 30. The transmitter node 26 may include a laser pulse source 46 for generating a bit stream of optical pulses. Although a laser pulse source 46 is described, it should be understood that other sources of the optical pulses may be used that generate the bit stream of optical pulses. It is possible depending on system design for one or more light emitting diodes (LED's) to be used to generate the bit stream of optical pulses.

The optical pulse output from the transmitter node 26 is an output bit stream of photons that are encoded bit values.

The photons may be temporally or spatially modulated photons and have a transmitted quantum basis that includes time and phase parameters, including optical polarization encoding. The photon polarization provides the complementary property used for encoding purposes and in the QSDC system as described, with optical pulses arranged in time bins in this example, photon polarization may be applied to conjugate states, such as phase encoding. The quantum communications system 20 may use entanglement of photon pairs. Each bit of information such as a "0" or "1" may be encoded onto an individual photon by selecting from a pair of orthogonal polarization states. In an example, two pairs of orthogonal states are used, and each pair of orthogonal states may be referred to as a "basis." The bases provide polarization state pairs in a rectilinear basis having vertical and horizontal polarization, such as 0° and 90°, and a diagonal basis having opposite diagonal direction polarization, such as 45° and 135°. It is also possible to use a circular basis of left-handedness and right-handedness depending on what other bases are used that are conjugate to each other.

The transmitter node 26 includes a controller 48 operatively connected to the laser pulse source 46 and other components at the transmitter node for controlling their operation, such that the laser pulse source is controlled for transmitting a photon in a polarization state defined by the bit and basis and in time bins, and record the time the photon was transmitted. This process is repeated for the string of bits as a stream of photons. The transmitter node 26 may include a transceiver 50 connected to the controller 48 and operative to communicate with conventional networked components via the communications system 22, and if additional functions for Quantum Key Distribution (QKD) with the receiver node 28 are provided with the communications system 22.

The transmitter node 26 transmits the bit stream of optical pulses via its output 51 over the quantum communications channel 30, such as the fiber optic communications channel 34, and as either separate or a part of the communications system 22, and either as temporally modulated photons or spatially modulated photons in an example. It is possible to use the same optical fiber for both quantum communications and conventional communications.

The receiver node 28 may include receiver opto-electronic (OE) circuitry 60 that receives via an input 61 the bit stream of optical pulses from the transmitter node 26 over the quantum communications channel 30. This OE circuitry 60 may include a spatial filter 62 and a beam splitter 64 for splitting the optical signal into optical phase or time streams for measurement in the phase basis or time basis as explained below. The spatial filter 62 may be used to "clean up" the stream of optical pulses and produce a smooth intensity profile as a cleaner Gaussian signal that has unwanted multiple-order energy peaks removed such that the central maximum of a diffraction energy pattern will be passed through the OE circuitry 60. The spatial filter 62 may include a microscopic objective lens, a pinhole aperture and a positioning mechanism having precision X-Y movement at the center of the pinhole that operates as the focal point of the objective lens in a non-limiting example. The spatial filter 62 is also advantageous since it operates as a filter for the spatial probability distribution function that cannot be characterized, cloned and reintroduced to the public portion of the quantum communications channel 30. Thus, any spatial probability distribution disturbances that are introduced may not cleanly exit the spatial filter 62, and thus, Bob at the receiver node 28 may use this information as a metric to reveal tampering.

Figure 2A:
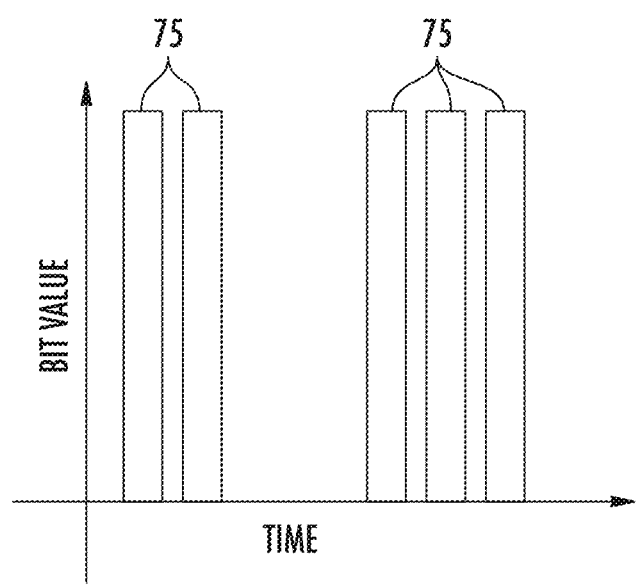
FIG. 2A is a graph showing optical pulses in the time domain that are used with the optical communications system of FIG. 1.

An optical detector circuit 66 receives the bit stream of optical pulses from the OE circuitry 60 and detects the optical pulses and generates signals that may be processed at a controller 70, which processes and demodulates the signals representative of the optical pulses depending on the communications protocol. At the receiver node 28, the optical detector circuit 66 may be formed as a single photon detector 74 for measuring photons in the time basis and in respective time bins as the graph of FIG. 2A shows, where the optical pulses are transmitted in respective time bins 75 for data encoding. The bit value is shown on the vertical axis and time on the horizontal axis. In an example, the optical detector circuit 62 may include an array of single photon detectors 74. The optical detector circuit 66 also includes a phase detector 76 for measuring the photons in the phase basis.

The controller 70 at the receiver node 28 may be connected to a conventional transceiver 80, also located at the receiver node 28. This transceiver 80 may communicate via the conventional or non-quantum communication system 22 with the other networked components or to the transceiver 50 located at the transmitter node 26. The transmitter node 26 may include other components not illustrated in detail, such as a spatial light modulator (SLM) that imposes a spatially varying modulation by modulating intensity and phase, a waveguide array that increases bit generation and phase bin states, and an attenuation filter. These components may be used to transmit temporally modulated photons or spatially modulated photons and perform optical polarization encoding. As noted before, the OE circuitry 60 at the receiver node 28 includes the spatial filter 62 and the beam splitter 64 to split any incoming optical pulse streams for time processing and phase processing as explained in greater detail below. The optical detector circuit 66 includes the phase detector 76 and single photon detector 74 for phase basis and time basis measurements, respectively.

Figure 2B:
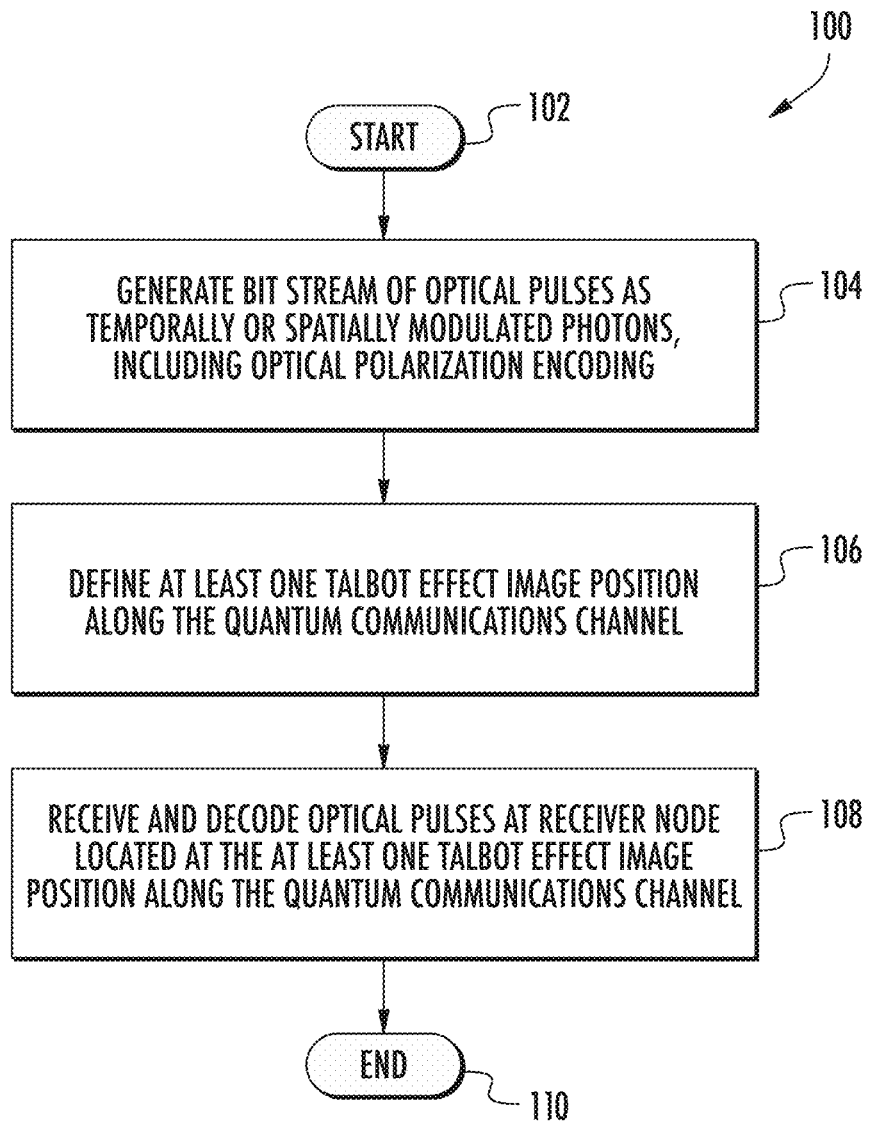
FIG. 2B is a high-level flowchart of a method for operating the quantum communications system of FIG. 1.

A flowchart illustrating the method of operating the quantum communications system 20 is illustrated in FIG. 2B at 100. The process starts (Block 102) and the laser pulse source 40 at the transmitter node 26 generates a bit stream of optical pulses, which may be temporally or spatially modulated photons and include optical polarization encoding (Block 104). The transmitter node 26 defines at least one Talbot effect position along the quantum communications channel 30 (Block 106). The receiver node 28 is located at the Talbot effect image position and the optical pulses are received and decoded at the receiver node, such as based on the time bins for the photons as transmitted (Block 108). The process ends (Block 110).

There now follows greater details of the quantum communications system 20 operative as a QSDC system and how the quantum communications system 20 employs single photon self-interference, achieved through the quantum Talbot effect, to bridge performance gaps in the quantum communication channel 30. Based on single photon self-interference achieved through the quantum Talbot effect, the quantum communications system 30 may reduce the mutual information between Eve and Bob 28 at the receiver node, and Eve and Alice 26 at the transmitter node to allow more secure QSDC communications without any interference or data breach by Eve. The quantum communications system 20 as a QSDC system may have a higher sensitivity to tampering than achievable by directly sending the states without the Talbot effect, which may allow the users to maintain tamper evident communications while operating in demanding high loss communication links. Secure quantum transmissions between Alice 26 and Bob 28 is dependent on securing the channel where information between Alice and Bob is greater than the information between Eve and Alice, or between Eve and Bob.

Generally, an eigenstate $|\Psi\rangle$ as a photon of a particular basis is prepared and transmitted from the transmitter node as Alice 26 over the quantum communications channel 30 to the receiver node as Bob 28. In a conventional QSDC system, if the eigenstate $|\Psi\rangle$ was prepared in the same photon basis that Eve or Bob 28 chooses to measure the quantum state in, both will measure the same state that Alice 26 initially prepared. If Eve or Bob 28 choose a different basis than the one Alice 26 initially prepared the quantum state in, both would collapse the eigenstate $|\Psi\rangle$ into one of the eigenstates of the basis they were measuring in, and would have a 50% chance in a d=2 data structure, for example, corresponding to a random guess, of correctly identifying the associated bit value of the state that Alice sent. This use of mutually unbiased bases, and the impact of preparing and measuring in inconsistent bases, is used to establish a more secure communications link between Alice 26 and Bob 28 over the quantum communications channel 30. As Eve is forced to annihilate the state Alice 26 has prepared as a single photon in order to gain any information about it, and as Eve must randomly choose a basis to measure the state in, on average Eve will choose the wrong basis 50% of the time, both resulting in measurements which do not provide Eve information about the original state, and revealing Eve's presence to Bob 28 downstream through a quantum bit error rate (QBER) that is higher than a certain threshold value.

It is generally assumed that the eigenstate $|\Psi\rangle$ prepared in a particular basis, does not change as it propagates. Thus, If Eve and Bob 28 choose the same basis to measure the state that Alice 26 initially used to prepare the state in, Eve and Bob will both measure it accurately. For a 4-state transmission, however, Eve has on average a 75% chance of correctly retrieving the bit value that Alice 26 sends, as she has a 50% chance of correctly choosing the right basis and 100% accuracy of retrieving the associated bit value in the correct basis, and a 50% chance of choosing the wrong basis, and a 50% accuracy of retrieving the associated bit value when measuring in the wrong basis. The amount of error that Bob 28 can tolerate before knowing that the quantum communications channel 30 is insecure and that Eve is present, is in part dependent on this probability, which essentially reflects the amount of information that Eve has access to.

Increasing the maximum threshold of the quantum bit error rate (QBER) that Bob 28 can tolerate before concluding that the quantum communications channel 30 is insecure may increase secure link lengths, increase secure bit rates, and enable more efficient and cost effective implementations of the quantum communications system 20 in existing communication links and better enable secure communications for a QSDC system.

The quantum communications system 20 increases the maximum QBER threshold where an initial state $|\Psi\rangle$ evolves nonlinearly within the segment of public link of the quantum communications channel 30 that Eve has access to so that any measurements made at a location other than where Alice 26 and Bob 28 are located will reduce the information available to Eve, even if Eve chooses to measure $|\Psi\rangle$ in the same basis that the state was initially prepared in. The quantum communications system 20 may reduce Eve's information about the eigenstate $|\Psi\rangle$ in the public segment of the quantum communications channel 30 even for measurements she conducts in the correct basis. The QBER threshold required for unconditional security may be increased even when Eve chooses the right basis. The probability that Eve will measure the state Alice 26 initially sent is reduced. As a result, using the quantum communications system 20 of FIG. 1 as a QSDC system, Alice 26 and Bob 28 may tolerate higher system losses, increase communication link distances, relax optical detector requirements, and adapt the system into existing telecom networks.

Figure 3:
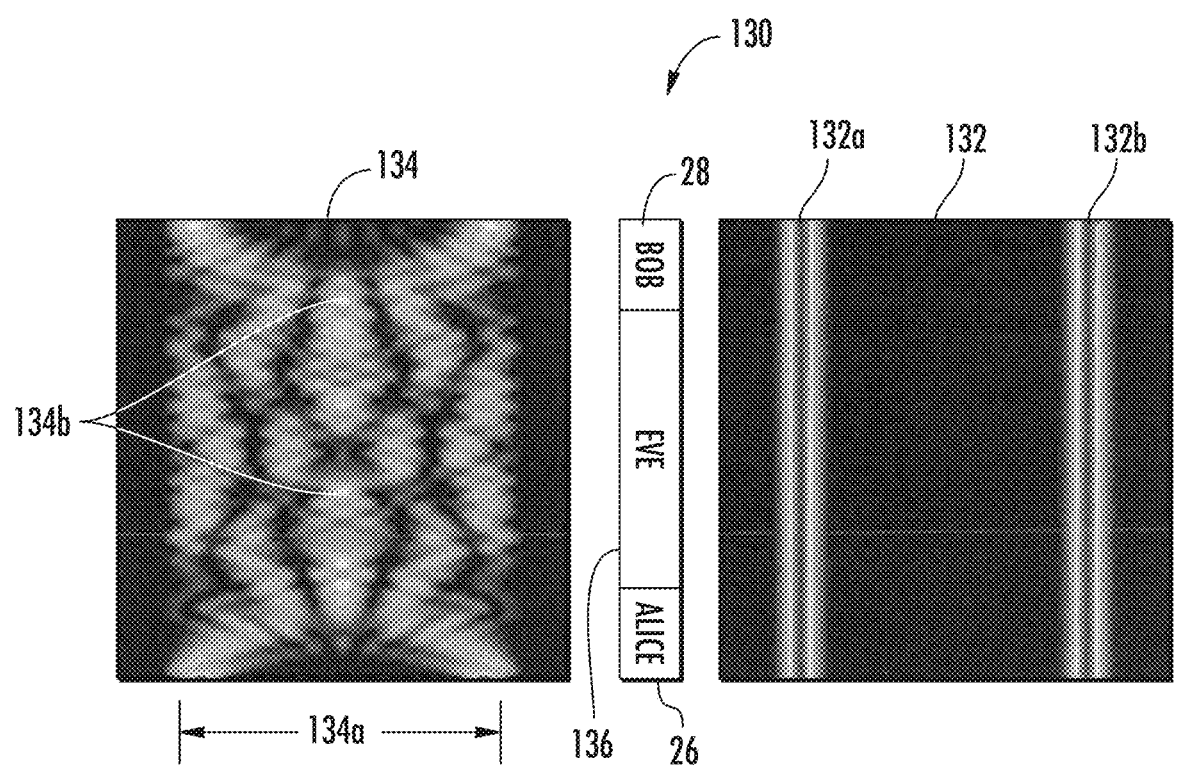
FIG. 3 are images comparing optical pulse propagation in a conventional QSDC system and the quantum communications system of FIG. 1 operating as a QSDC system.

Referring now to FIG. 3, two optical pulse propagation images are shown generally at 130 for a conventional quantum secure direct communications (QSDC) system 132 on the right and showing two narrow optical pulse transmission bands 132a and 132b, corresponding to the outer waveguide such as a single mode optical fiber 36. The optical pulse propagation image 134 on the left is for the quantum communications system 20 operative as a QSDC system and showing the spread energy within the waveguide between the lines at 134a with the Talbot effect image positions formed as indicated at 134b. The lower section of the images corresponds to Alice 26 as the transmitter node, and the middle "public" area has Eve indicated at 136, located anywhere in that public link within the quantum communications channel 30. Bob 28 as the receiver node is at the top. Hereinafter, Eve will be referred to by the reference numeral 136. In the image 134 for the quantum communications system 20 shown in the left, even if the correct basis is chosen by all parties, the information about the quantum state that is available to Eve is less than the information that is available to Alice 26 and Bob 28, thus providing performance enhancements, as compared to the image 132 of the conventional QSDC system shown on the right.

As the QBER increases, less secure communications occur. The quantum communications system 20 as a QDSC system may use a nonlinear evolution in the public communications link where Eve 136 may be located, which may increase the threshold QBER, and allow more secure communications in lossy field applications and in longer communication links for more reliable QSDC systems.

It is possible to model the quantum communications system 20 where a photon in an eigenstate $|\Psi\rangle$ undergoes a nonlinear transition during transmission from Alice 26 to Bob 28. The temporal and spectral properties of the photon may be analyzed as time binned photons, such as shown in the graph for the pulses in FIG. 2A, which can be more robust to certain channel conditions than polarization, and the orbital angular momentum (OAM) of light. The quantum communications system 20 as a QSDC system may account for dispersion of the single photon and nonlinear phase effects. Nonlinear phase accumulation due to the self-phase modulation that the photon imparts on itself is small, but is still included in the description. The quantum communications system 20 as a QSDC system may account for the impact of cross phase modulation on the single photon, imparted by one or more co-propagating pump pulses. The two governing equations describing the temporal evolution as a temporally modulated photon of a single photon and pump pulses are shown below where "p" and "q" designate the pump and single photon, respectively:

$$\frac{dA_p(z,t)}{dz} = i\frac{\beta_p}{2}\frac{d^2A_p(z,t)}{dt^2} - i\gamma|A_p(z,t)|^2 A_p(z,t) - i2\gamma|A_q(z,t)|^2 A_p(z,t)$$

$$\frac{dA_q(z,t)}{dz} = i\frac{\beta_q}{2}\frac{d^2A_q(z,t)}{dt^2} - i\gamma|A_q(z,t)|^2 A_q(z,t) - i2\gamma|A_p(z,t)|^2 A_q(z,t).$$

These equations describe coupled and extended nonlinear Schrödinger (NLSE) equations for a pump $A_p$ as a laser pulse source 46 and a photon $A_p$ describing the temporal evolution of the two waves as they propagate a distance "z" down an optical fiber 34 as the quantum communications channel 30.

The quantum communications system 20 may process data using various algorithms at the respective controllers 48,70 and use a split step Fourier algorithm, where the dispersion operator is solved in the frequency domain, and a nonlinear operator is solved in the time domain. It is possible to implement a fourth order Runge Kutta operator to solve for the nonlinear operator. Provided that step sizes are small enough to minimize the nonlinear phase accumulation in each step, the split step algorithm models the temporal evolution of an ultrafast optical mode.

A simulation was performed that modeled the dispersive and nonlinear effects and propagation of a theoretically predicted optical soliton through a length of 100 meters of optical fiber, where the optical field did not change during propagation. For a correct numerical implementation of these governing equations, the initial soliton should not change temporal or spectral shape as it propagates, since the dispersive and nonlinear phases will balance each other as shown in FIGS. 4A and 4B, where the optical pulse images for the soliton propagation are shown, considering a center wavelength of about 1550 nm, a pulse width of about 1 ps, a pulse energy of about 51 pJ, a link length of about 100 m with SMF28, a GVD of about −0.02 ps^2/m, and a gamma of about 0.00143 rad/m.

Figure 4B:
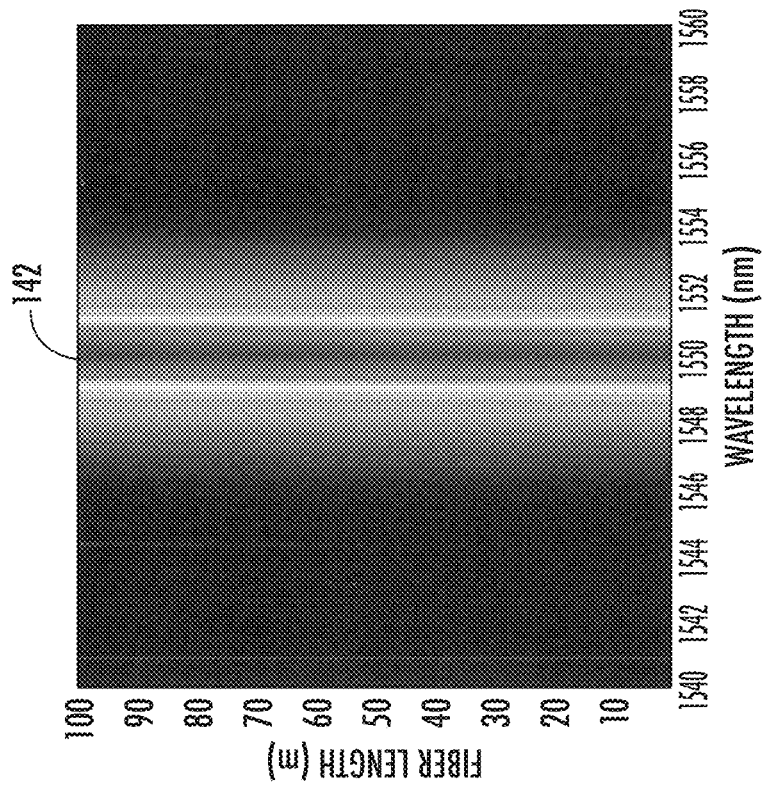
FIG. 4B is an image of soliton propagation for an optical pulse in the frequency domain evolution.
Figure 4A:
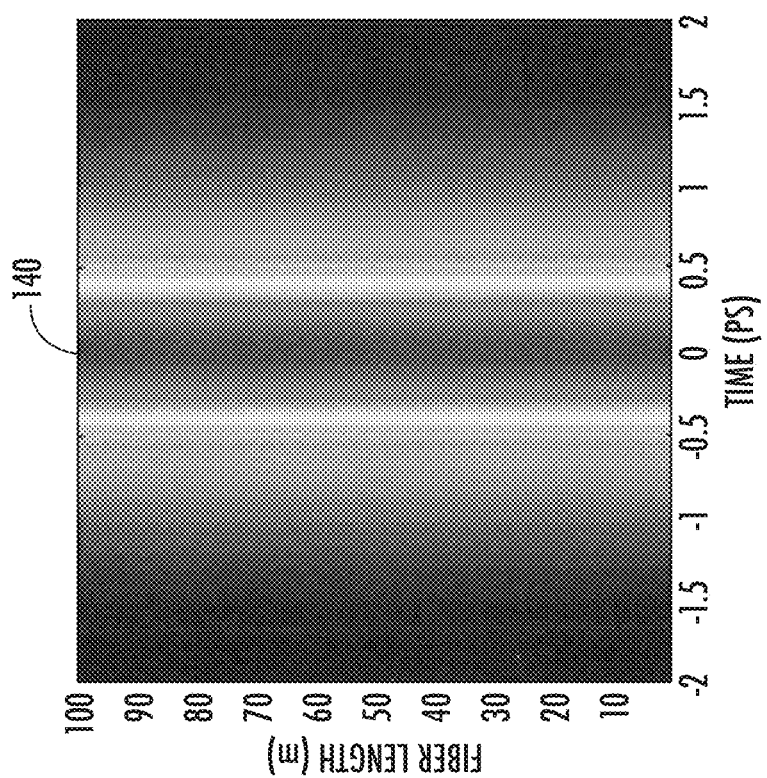
FIG. 4A is an image of soliton propagation for an optical pulse in the time domain evolution.

Both FIGS. 4A and 4B have the fiber length in meters on the vertical axis. The time domain evolution is shown in FIG. 4A at 140 with the time in picoseconds on the horizontal axis, as compared to the frequency domain evolution shown in FIG. 4B at 142 with the wavelength in nanometers (nm) on the horizontal axis. It is evident that the time domain 140 extends about −0.5 to 0.5 (FIG. 4A) and the frequency domain 142 extends in a wavelength spread of about 1548 nm to 1552 nm (FIG. 4B). However, for even small changes in the energy or temporal width of the optical pulse, it may accrue nonlinear and dispersive phases in different magnitudes for the same propagation distance and will not remain invariant as it propagates.

The quantum communications system 20 of FIG. 1 is operative as a QSDC system and uses the Talbot effect as applied to single photon imaging. The quantum communications system 20 as a QSDC system reduces the probability that Eve 136 correctly detects the state $|\Psi\rangle$ that Alice 26 sends to Bob 28, even if Eve correctly identifies the basis that the state $|\Psi\rangle$ was prepared in. The quantum communications system 20 makes use of single photon self-interference on the probability distribution function of the photon. The probability distribution function of the photon is broadly distributed and smoothed out from the initial state, so that where Eve 136 is located it has some probability of detection in all of the potential measurement bins of the protocol, whereas at the receiver node 28 for Bob, the probability distribution function is well localized to the measurement bin that Alice 26 initially prepared the photon in. Thus, Bob has a greater probability than Eve 136 of correctly determining the bit value that Alice 26 was trying to send. This is obtained via the quantum communications system 20 using the Talbot effect image position 40 in waveguides for a more secure QSDC system.

The Talbot effect references a particular evolution of the spatial or temporal optical field within a waveguide, e.g., single mode fiber 36 or multi-mode fiber 38. If the optical field is symmetric about the waveguide boundaries, and it is not an eigenmode of the waveguide, diffraction or dispersion for the respective spatial or temporal mode will cause the mode to spread. Once the mode reaches the waveguide boundary, it reflects, and forms a virtual image of the initial state. This process continues, where virtual images with particular phase displacements relative to each other are generated. These virtual images continuously interfere with each other as they propagate down the waveguide. For particular integer multiples of the Talbot distance, these images come together with the correct relative phases to reconstruct the original optical field.

When the receiver node as Bob 28 is positioned at the Talbot reimaging distance also termed the Talbot effect image position 40 (FIG. 1), any measurement Bob makes would provide more information about the photon state Alice 26 initially sent, than a measurement made by Eve 136 anywhere else in the public area of the quantum communications channel 30.

Figure 5:
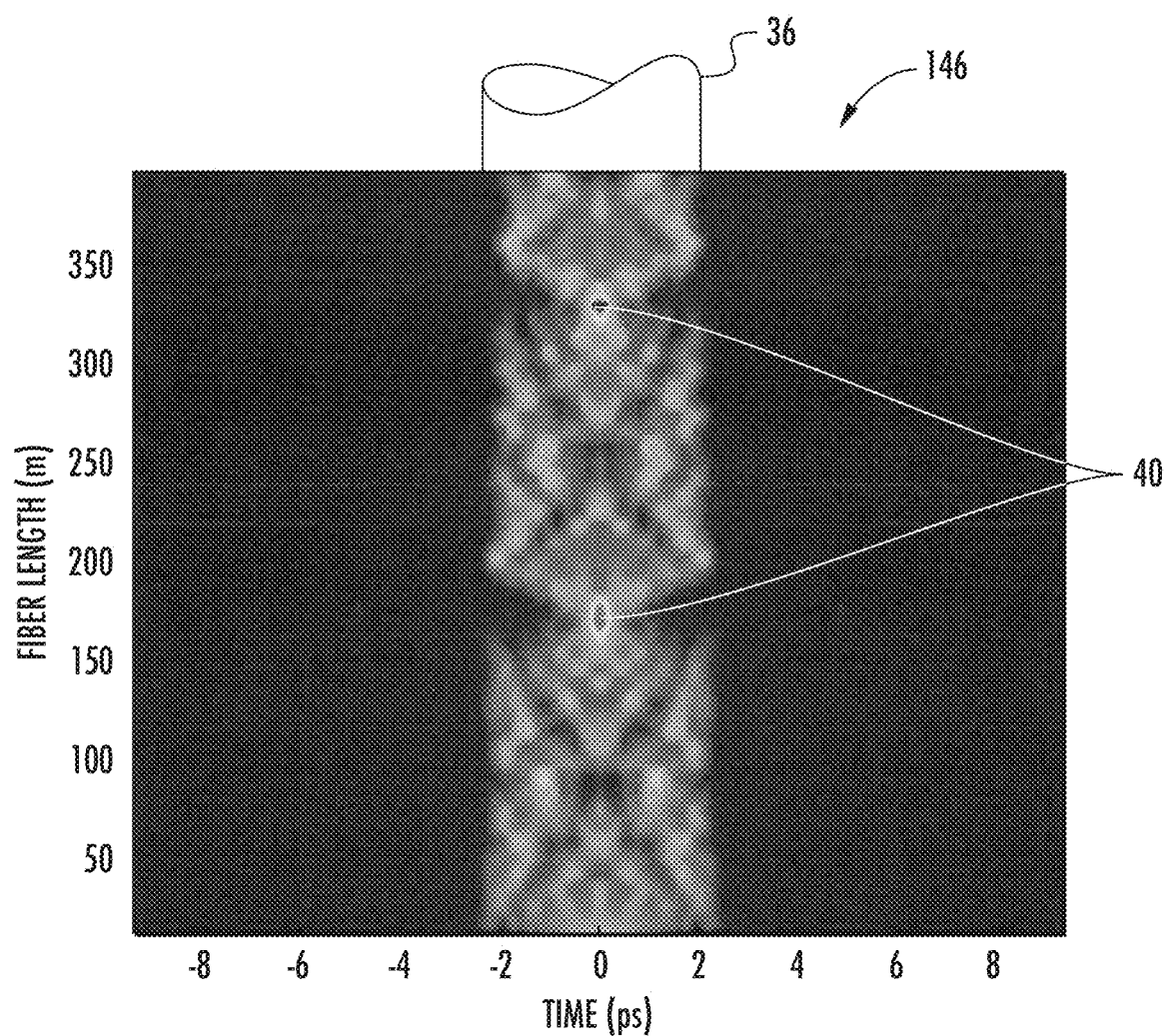
FIG. 5 is an image showing an example of Talbot effect image positions along a waveguide.

The quantum communications system 20 as a QSDC system makes use of the Talbot effect at the single photon level, where the spatial or temporal mode structures are no longer the field amplitudes in time or space, but are now related to the probability distribution functions in space or time. As shown in the optical pulse propagation image 146 for the time domain evolution for a single photon in FIG. 5, the Talbot effect image positions are illustrated at 40, corresponding to the location in the optical communications system 20 in FIG. 1. For those locations along the waveguide not at the Talbot effect image position 40, the single photon probability distribution function expands to include the entire width of the waveguide, which for purposes of explanation is shown diagrammatically at 36, corresponding in this example to a single mode optical fiber. This image of the optical pulse propagation in the time domain evolution of FIG. 5 is an example of the Talbot effect in a temporal waveguide, and in this case, by injecting a 1 ps FWHM single photon energy pulse into the temporal waveguide, formed by two co-propagating ~200 fs FWHM soliton pulses, separated temporally by 5 ps. The fiber length in meters is shown on the vertical axis and the time in picoseconds is shown on the horizontal axis. As the single photon pulse propagates, virtual images of the photon form and interfere, resulting in a much broader temporal probability distribution function of the single photon.

As the Talbot image point corresponding to the Talbot effect image position, and integer multiples of it illustrated at 40 in the optical pulse propagation image of FIG. 5, the initial field is re-constructed. The quantum communications system 20 uses a protocol where measurement bins, e.g., time bins, fill the window of a waveguide, and then launch an initial state within one measurement bin. As the optical pulse propagates, the pulse will fill other measurement bins with a spatially varying probability amplitude. As a result, any measurement not made at the Talbot effect image position 40 or integer multiples will contain some probability of the state being in a measurement bin that it was not initially prepared in. However, at the Talbot effect image position 40 or integer multiples, the measurement will faithfully reveal the state of the original wave function. The quantum communications system 20 may tolerate a higher QBER threshold, which enables the quantum communications system 20 to be used in higher loss environments or operated over longer link lengths.

Figure 6A:
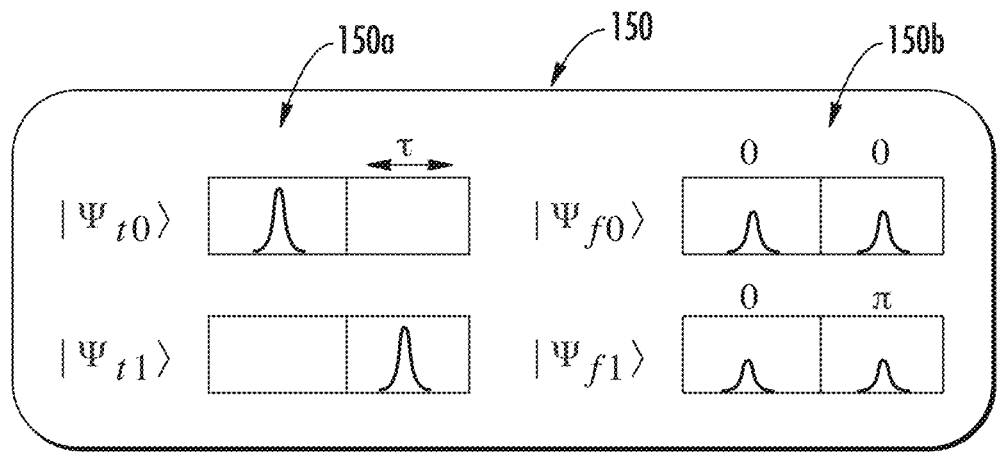
FIG. 6A is a schematic diagram showing time and phase basis states in a conventional QSDC system.
Figure 6B:
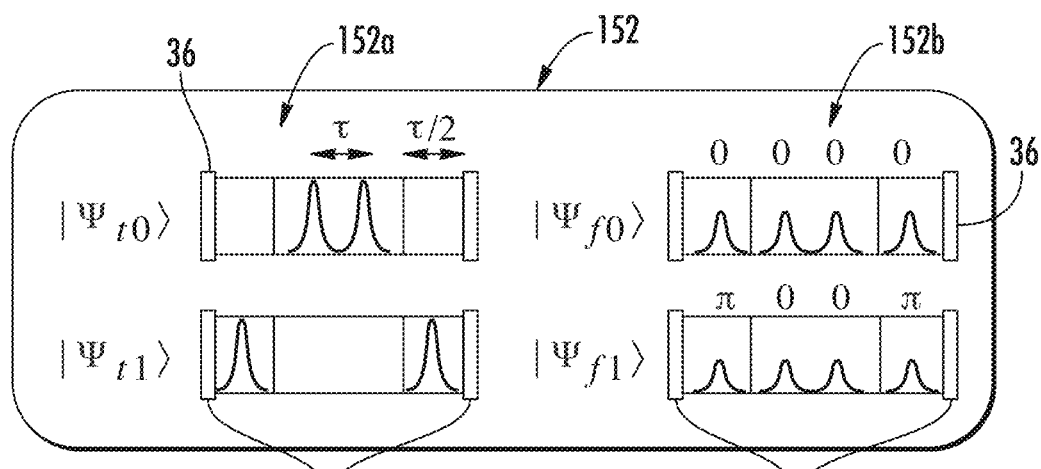
FIG. 6B is a schematic diagram showing time and phase basis states in the quantum communications system of FIG. 1 operating as a QSDC system.

The quantum communications system 20 operating as a QSDC system is compatible with Talbot reimaging. The quantum communications system 20 may form time and phase basis states such that two orthogonal eigenstates in any one basis are projected into mutually unbiased basis states. The quantum states are conducive with the requirement for Talbot imaging such that the eigenstates of each basis are symmetric about the waveguide boundaries. This can be accomplished by modifying the standard time-phase data encoding structures. For example, in FIG. 6A, the data encoding structures 150 for the time and phase basis states are shown respectively at 150a and 150b in a conventional QSDC system. The time spacing between each bin is $\tau$. The quantum communications system 20 of FIG. 1 and operative as a QSDC system, on the other hand, has time-phase basis eigenstates that are compatible with the Talbot effect and symmetric about the waveguide boundaries, but which are also indiscriminate from each other when represented in a mutually unbiased basis as shown by the data encoding structures at 152 in FIG. 6B with the time and phase basis states shown respectively at 152a and 152b. The time width of the central bin is $\tau$, and the time spacing of the two adjacent bins is $\tau/2$. The waveguide may be a single mode optical fiber 36 as shown by its boundary using its reference numeral 36, corresponding to that of FIG. 1.

Figure 7:
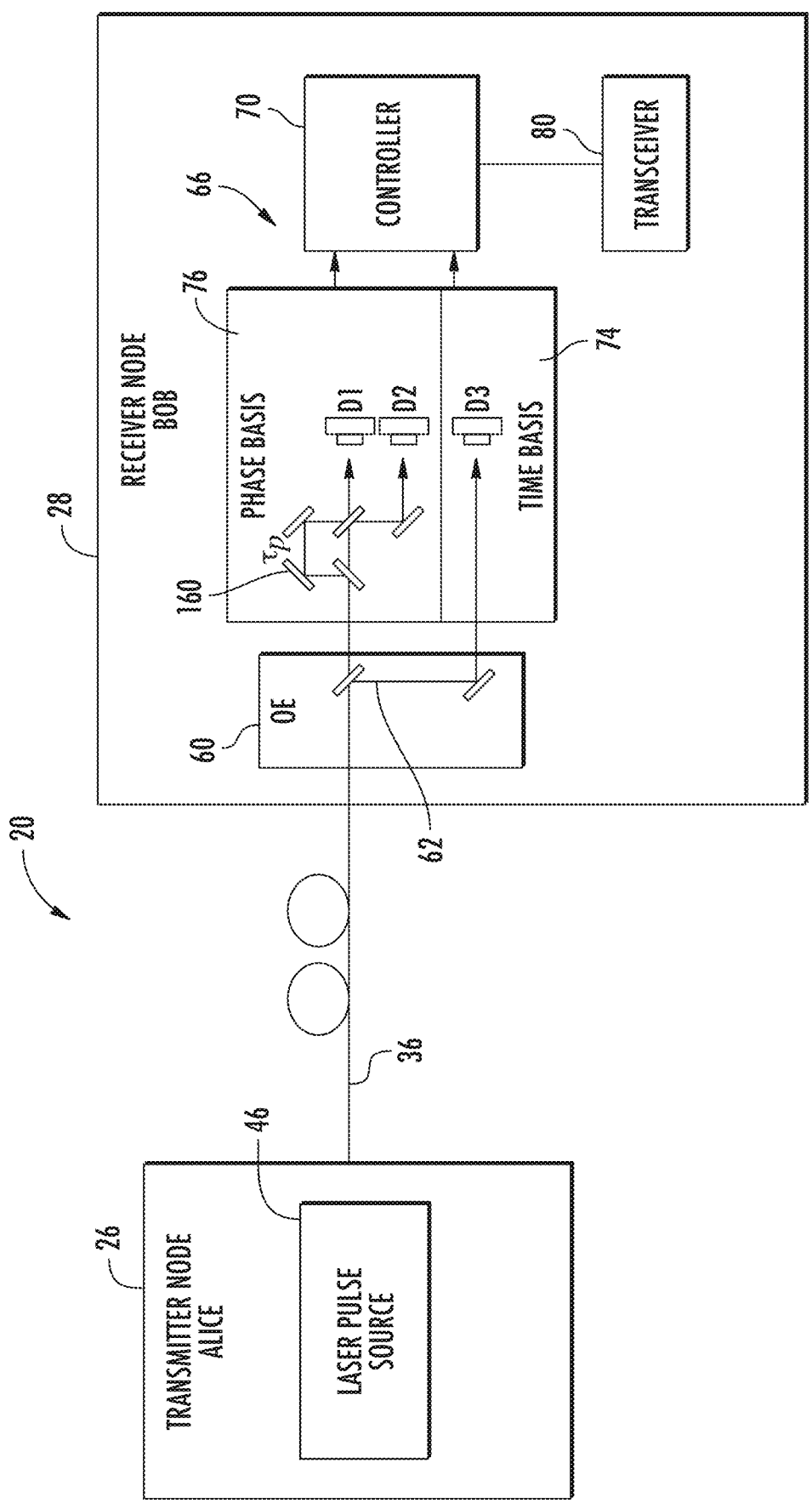
FIG. 7 is a schematic block diagram of the quantum communications system of FIG. 1 showing phase and time basis detectors at the receiver node.

Further details of pulse detection occurring at the receiver node 28 are explained relative to FIG. 7, where a more general schematic block diagram is illustrated, and showing the optical detector circuit 66 having a phase basis section as part of the phase detector 76, which includes detectors D1 and D2 for phase basis measurements, and in this example, a single photon detector 74 for time basis measurements and including detector D3. The quantum communications system 20 results in the correct determination of the state for the quantum basis it is intended to be measured in, and inconclusive results of the state when measured in an unintended basis. As shown in FIG. 7, the phase detector 76 includes detectors D1 and D2, and the single photon detector 74 includes detector D3 and operating to measure the time bin photons as shown in the graph of FIG. 2A. Time basis measurements may be performed with direct detection to resolve the arrival times of pulses associated with the various bit values that Alice 26 sends. It is also possible to use the time to frequency conversion as disclosed in commonly assigned U.S. patent application Ser. No. 16/583,346 filed Sep. 26, 2019, under the title, "Quantum Communication System Having Time to Frequency Conversion and Associated Methods," the disclosure which is hereby incorporated by reference in its entirety.

An incoming photon may be randomly directed by the beam splitter 64 to either a time basis measurement at the single photon detector 74 (D3) or a phase basis measurement at the phase detector 76 (D1 and D2). For time basis measurements, detector D3 as the single photon detector 74 detects the arrival time of the photon, which correlates with a particular time bin and associated bit value.

Figure 8:
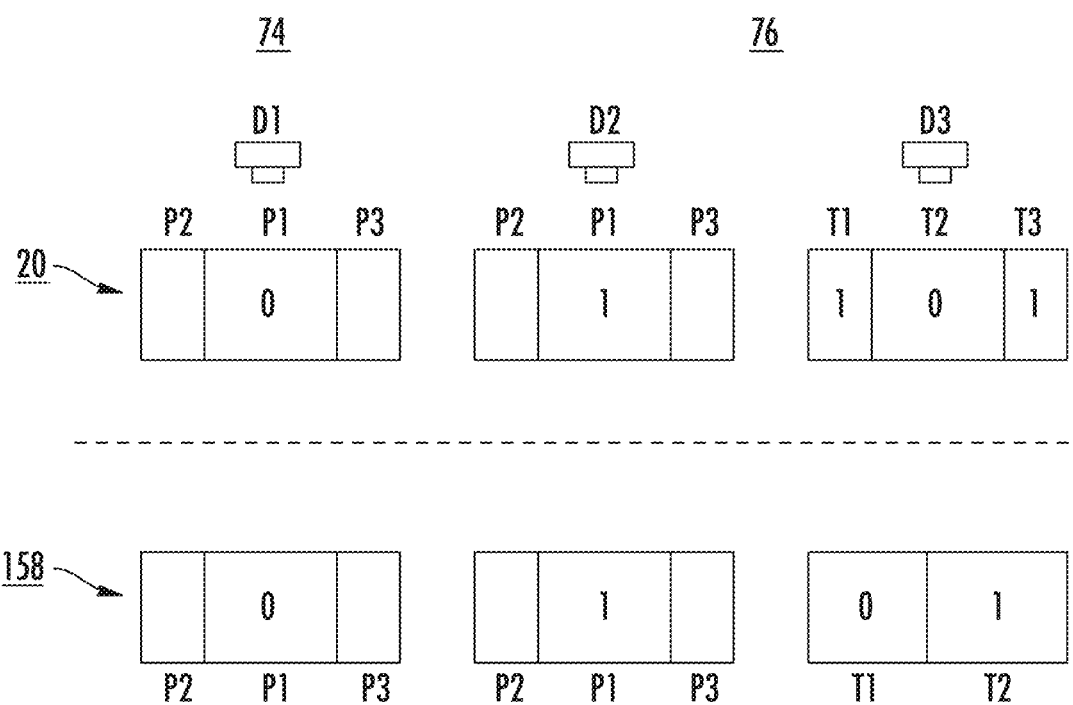
FIG. 8 is a schematic diagram showing bit values for the detectors in the quantum communications system of FIG. 7 and comparing a conventional QSDC system and the quantum communications system of FIG. 7 that operates as a QSDC system.

A comparison can be made between the quantum communications system 20 and its time and phase bins for detectors D1, D2 and D3 in FIG. 8 and indicated by reference numeral 20 and operative as a QSDC system, and a conventional QSDC system referenced by numeral 158.

For the phase basis measurement at the phase detector 76 and its detectors D1 and D2, a recorded event in the central time window of detectors D1 or D2 reveals the associated bit value of the photon. For the conventional QSDC system 158, the path length difference $\tau_p$ of a Mach-Zender interferometer that is typically used with the system 20, and shown diagrammatically at 160 in FIG. 7 at the phase detector 76 for the current system, is the size of the time bin spacing $\tau$. In operation of the quantum communications system 20, the size of the central time spacing $\tau$ may be a half width of a temporal waveguide.

Associated bit values for the phase detector 76 and its detectors D1 and D2, and the time basis single photon detector 74 and its detector D3, are shown diagrammatically in FIG. 8 based on the arrival times of the photon for the quantum communications system 20 operative as a QSDC system and for a conventional QSDC system 158. For the phase basis, the arrival time bins are designated P2, P1, and P3. The center bin P1 gives reliable information about the state. For the time basis, the arrival time bins are designated T1 and T2 for the conventional QSDC system 158, and T1, T2, and T3 for the quantum communications system 20. Each arrival time yields important data about the associated bit value.

Phase basis measurements may be performed by passing the single photon state through the Mach-Zender interferometer 160 (FIG. 7), which has a delay set by the time bin width of a protocol for the conventional QSDC system 158 or a half width of the waveguide for the quantum communications system 20 as a non-limiting example. Single photon interference occurs in a central time window, which the two outputs of the Mach-Zender interferometer 160 resolve constructively or destructively depending on the eigenstate of the phase basis that was sent. For example, if phase state 1 was sent with an associated bit value 0, the phase detector 76 would yield a detection event for P1 on Detector 1, and no detection event on P1 of Detector 2 (FIG. 8). There is a non-zero probability amplitude of a detection event in the other arrival time bins (P2 and P3) for both of detectors D1 and D2 in the phase basis. However, detection events in these time bins do not help discriminate between the two states, and so they are not used to make state determinations, e.g., only the central time bins "P1" are used.

Referring again to FIG. 7 and the description relative to the bins shown in FIG. 8, further details of the re-imaging and detection of four photon states are explained with description of both temporal and phase information in the re-imaging process as an example, such as used with quantum key distribution. The basis measurement choice (time or phase) is less applicable to direct communications, except that both the sender and receiver need to know that they are sending and receiving the same base. For example, if Alice 26 sends a 1 in the time basis, by generating the single photon wave function $|\Psi_{t1}\rangle$ and using the Talbot effect where Bob 28 is positioned at the re-imaging point as the Talbot effect image position 40 (FIG. 1), and if Bob chooses to measure in the time basis, Bob will detect a photon arriving in either the T1 or T3 window and the wave function will collapse into one of these measurement bins. For a detection event in either T1 or T3, the associated bit value is 1. Thus, if Bob 28 chooses the same basis that Alice 26 prepared the photon in, Bob will retrieve the correct bit value for that measurement. However, if Bob 28 chooses to measure in the phase basis, and Bob looks for a detection event within the time window P1 on both detectors D1 and D2 at the phase detector 76, Bob will collapse the single photon wave function to either one of those two states, with equal probability.

Figure 9B:
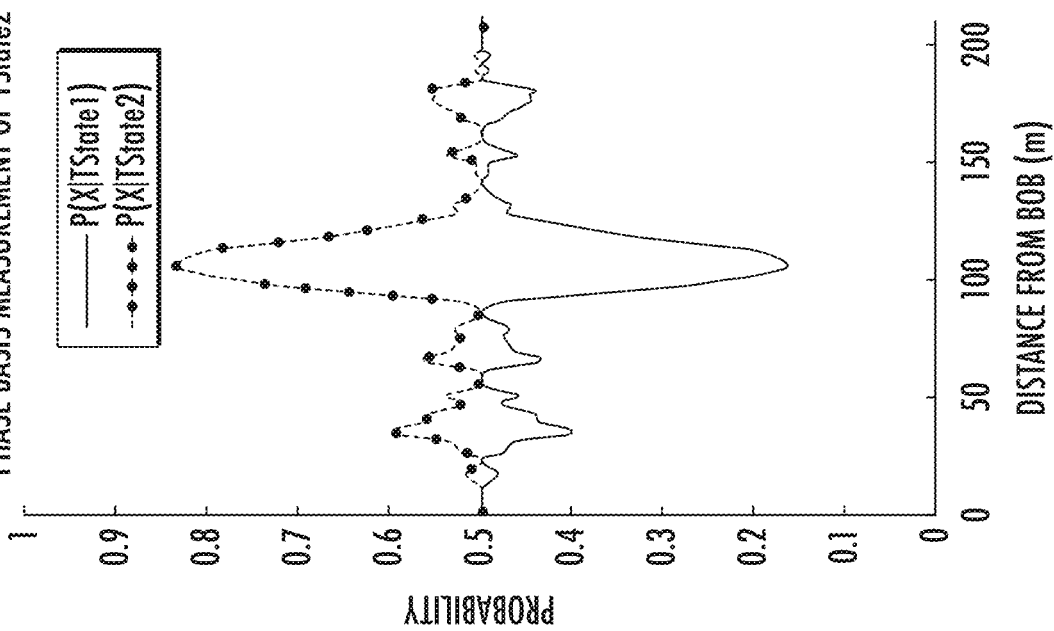
FIG. 9B is a graph showing phase basis measurements and the probability of detection versus distance for the quantum communications system of FIG. 1.
Figure 9A:
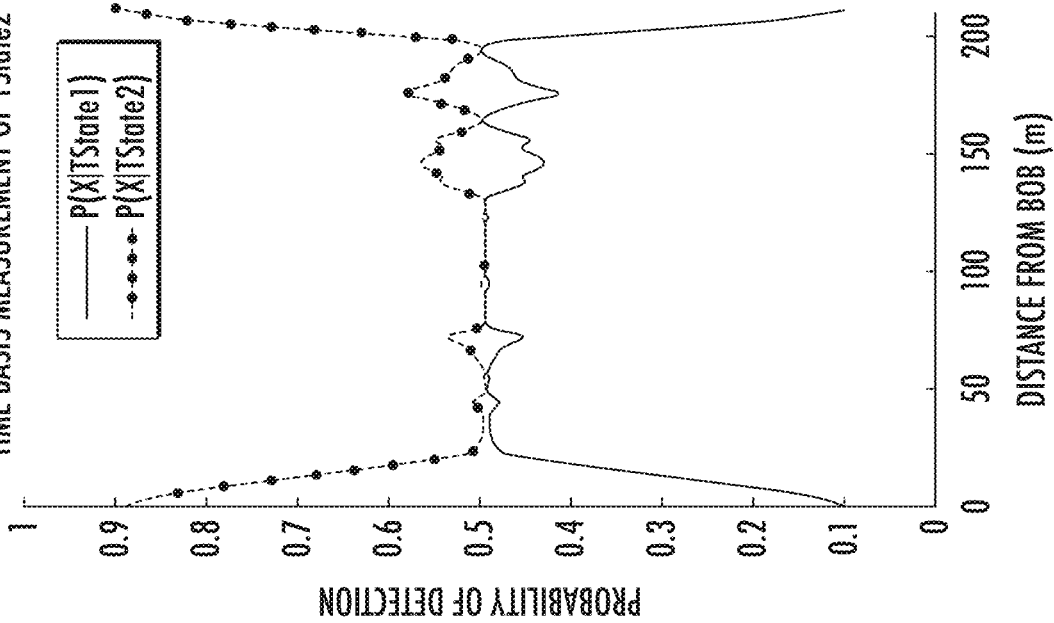
FIG. 9A is a graph showing time basis measurements and the probability of detection versus distance for the quantum communications system of FIG. 1.

If Alice 26 sends $\Psi_{t1}$ and Bob 28 or Eve 136 measures in the time basis, or the phase basis, probabilities may be obtained as shown in the graphs of FIGS. 9A and 9B, both graphs showing probability of detection on the vertical axis of 0 to 1.0 and the distance from Bob in meters. This is relevant especially in QKD, where the time basis of measurement is shown in FIG. 9A and the phase basis of measurement is shown in FIG. 9B. The probability of the two time states 1 and 2 are shown for the time basis (FIG. 9A) and phase basis (FIG. 9B). The Time State 2 is shown by the upper dotted line.

When Bob 28 is at the Talbot image point as the Talbot effect image position 40 in the quantum communications system 20, i.e., where the distance from Bob is 0 meters, the state that Alice 26 sent in the time basis is imaged at Bob's location, and thus, correctly detected by Bob, for example, as shown at FIG. 9A, showing the time basis measurement of Tstate2 with a high probability of detection at about 0.9. At one-half distance of the Talbot effect image position, i.e., the midpoint of the Talbot effect image position and midpoint as distance from Bob, the initial state $\Psi_{t1}$ evolves to $\Psi_{f1}$, and thus, a phase basis measurement at this location (FIG. 9B) can be used to distinguish between the two eigenstates in the time basis which are transformed into eigenstates in the phase basis, whereas a time basis measurement at this location cannot. Thus, if Eve 136 knew this location, e.g., at 110 m from Bob 28 as shown in FIG. 9B, showing the phase basis measurement of Tstate2, and the knowledge of how states transformed as a function of distance, Eve may know that measurements made in the opposite basis from the one that Alice 26 prepared the state in, would yield information about the state. Then, in an intercept-resend attack, Eve 136 could resend the associated bit value to Bob 28 in the opposite basis from the one Eve measured in, e.g., in the same basis that Alice 26 prepared the state in. If Alice 26 sends $\Psi_{t1}$ and both Bob 28 located at the Talbot effect image position 40 and Eve 136 is located anywhere else in the communications link know that Alice sent in the time basis, the probabilities of them detecting each eigenstate of the time basis when measuring in either the time basis, or the phase basis, are illustrated in FIGS. 9A and 9B when the quantum communications system 20 of FIG. 1 is used.

It is also possible to spatially modulate photons. In the spatial domain, e.g., when spatially modulated photons are transmitted over multi-mode fiber 38 as the waveguide, single photon interference and Talbot re-imaging may be driven by diffraction within the multi-mode fiber as the waveguide. The description so far has primarily concerned temporal waveguides created by two co-propagating pump pulses imparting XPM on a single photon, and dispersion of the single photon to drive the single photon interference. There are several practical advantages to using a spatial waveguide, such as multi-mode fiber 38, to provide the reflective boundaries required for single photon interference. For example, the ease of experimental implementation favors spatial waveguides. Further, the cost of implementation is expected to be reduced as it would not necessarily require the use of a mode-locked laser sources. A reformulation of basis states in space/spatial phase rather than time/phase would be employed and an analogue detection architecture could be employed.

The quantum communications system 20 operates as a QSDC system and allows the formation of space-phase basis eigenstates, and detection architectures. It is possible to determine the security impacts of measurements made in a third mutually unbiased basis. The practice of using two bases to prepare and measure information has been adopted. However, as noted above, Eve's 136 information about the state that Alice 26 sent is reduced to a random guess in both bases and it may be possible that the third mutually unbiased basis could reveal more information about the state than a measurement in the two bases that Alice and Bob 28 are using. Further, as it appears that the initial state is transformed from an eigenstate of one basis, to the corresponding eigenstate of the other basis, it may be possible to position the receiver node 28 at one-half the Talbot re-imaging corresponding to the midpoint at the Talbot effect image position. There may be positions along the public section of the quantum communications channel 30 where the initial state is transformed into an eigenstate of a third mutually unbiased basis.

By adjusting the temporal spacing between pump pulses, and the pulse width of the pump pulses in the temporal waveguides such as single mode fiber 36, or the core size of the multi-mode fiber 38, it may be possible to identify an optimal design, e.g., maximum bit rate and maximum communications link. Further, temperature variations, core size variations, and bending radius may impact the performance of the protocol, which will help determine parameters for effective field use.

It is possible to generate different states with a spatial light modulator, and send each state through a multi-mode optical fiber 38, where the spatial and phase information of the state would be directly measured, and also measured with the space and phase detection architectures for QSDC systems. At the Talbot effect image position 40, there is almost perfect reimaging of the initial eigenstate. At one-half the Talbot distance corresponding to the midpoint, there is a transformation of the state to the corresponding eigenstate of the second basis, and this position may possibly be used.

It is evident that the quantum communications system 20 provides single photon self-interference, achieved through the quantum Talbot effect, as a physical layer of security for boosting performance metrics in quantum communication links and the quantum Talbot effect may be used in the quantum communications system 20 as a QSDC system.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A quantum communications system comprising:
   a transmitter node, a receiver node, and a quantum communications channel coupling the transmitter node and receiver node;
   the transmitter node cooperating with the quantum communications channel defining at least one Talbot effect image position along the quantum communications channel; and
   the receiver node being located along the quantum communications channel at the at least one Talbot effect image position.

2. The quantum communications system of claim 1 wherein the transmitter node is configured to generate temporally modulated photons.

3. The quantum communications system of claim 2 wherein the receiver node comprises a detector to detect phase binned states.

4. The quantum communications system of claim 2 wherein the receiver node comprises at least one single photon detector.

5. The quantum communications system of claim 2 wherein the quantum communications channel comprises a single mode optical fiber.

6. The quantum communications system of claim 1 wherein the transmitter node is configured to generate spatially modulated photons.

7. The quantum communications system of claim 6 wherein the quantum communications channel comprises a multi-mode optical fiber.

8. The quantum communications system of claim 1 wherein the transmitter node is configured to perform optical polarization encoding.

9. A quantum communications system comprising:
a transmitter node, a receiver node, and a quantum communications channel coupling the transmitter node and receiver node;
the transmitter node configured to generate temporally modulated photons and cooperate with the quantum communications channel defining at least one Talbot effect image position along the quantum communications channel; and
the receiver node being located along the quantum communications channel at the at least one Talbot effect image position, the receiver node comprising at least one single photon detector.

10. The quantum communications system of claim 9 wherein the receiver node comprises a detector to detect phase binned states.

11. The quantum communications system of claim 9 wherein the quantum communications channel comprises a single mode optical fiber.

12. The quantum communications system of claim 9 wherein the quantum communications channel comprises a multi-mode optical fiber.

13. The quantum communications system of claim 9 wherein the transmitter node is configured to perform optical polarization encoding.

14. A method of operating a quantum communications system comprising a transmitter node, a receiver node, and a quantum communications channel coupling the transmitter node and receiver node, the method comprising:
operating the transmitter node to cooperate with the quantum communications channel to define at least one Talbot effect image position along the quantum communications channel; and
operating the receiver node located along the quantum communications channel at the at least one Talbot effect image position.

15. The method of claim 14 wherein operating the transmitter node comprises generating temporally modulated photons.

16. The method of claim 15 wherein the receiver node comprises a phase detector.

17. The method of claim 15 wherein the receiver node comprises at least one single photon detector.

18. The method of claim 15 wherein the quantum communications channel comprises a single mode optical fiber.

19. The method of claim 14 wherein operating the transmitter node comprises generating spatially modulated photons.

20. The method of claim 19 wherein the quantum communications channel comprises a multi-mode optical fiber.

21. The method of claim 14 wherein operating the transmitter node comprises performing optical polarization encoding.

* * * * *